US012733076B2

(12) United States Patent
Huang et al.

(10) Patent No.: US 12,733,076 B2
(45) Date of Patent: Sep. 8, 2026

(54) PROJECTION DEVICE AND SAFETY PROTECTION METHOD OF PROJECTION DEVICE

(71) Applicant: Coretronic Corporation, Hsin-Chu (TW)

(72) Inventors: Yao Lei Huang, Hsin-Chu (TW); Sheng-Han Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 327 days.

(21) Appl. No.: 18/536,233

(22) Filed: Dec. 12, 2023

(65) Prior Publication Data

US 2024/0215133 A1 Jun. 27, 2024

(30) Foreign Application Priority Data

Dec. 22, 2022 (CN) ........................ 202211657868.X

(51) Int. Cl.
*H05B 47/11* (2020.01)
*G03B 21/14* (2006.01)
*H05B 47/115* (2020.01)

(52) U.S. Cl.
CPC ........... *H05B 47/115* (2020.01); *G03B 21/14* (2013.01)

(58) Field of Classification Search
CPC .... G03B 21/14; G03B 21/145; G03B 21/147; G03B 21/2013; G03B 21/2033; G03B 21/2053; G03B 21/2086; H05B 47/00; H05B 47/10; H05B 47/11; H05B 47/13; H05B 47/115; H05B 47/155
See application file for complete search history.

(56) References Cited

U.S. PATENT DOCUMENTS

2015/0219500 A1* 8/2015 Maes .................. H04N 9/3194 353/33
2017/0124926 A1* 5/2017 Mitsuhashi ............ G09G 3/001
2019/0149805 A1* 5/2019 Shpunt .................. H04N 23/11 348/46
2020/0118524 A1* 4/2020 Hong ....................... G08B 7/06
2021/0211624 A1* 7/2021 Arntsen ............... H04N 9/3161
2022/0308312 A1* 9/2022 Kobayashi ........... H04N 9/3179

FOREIGN PATENT DOCUMENTS

CN 203535368 4/2014
CN 113691787 11/2021

* cited by examiner

*Primary Examiner* — Sultan Chowdhury
(74) *Attorney, Agent, or Firm* — JCIPRNET

(57) ABSTRACT

A projection device and a safety protection method of the projection device are provided. The projection device calculates a warning range according to lens information. Whether an object enters the warning range is detected. The projection device is controlled to reduce brightness of a light source or turn off the light source in response to the object entering the warning range. The projection device and the safety protection method thereof proposed by the disclosure can effectively ensure the usage safety of the projection device.

14 Claims, 14 Drawing Sheets

PROJECTION DEVICE AND SAFETY PROTECTION METHOD OF PROJECTION DEVICE

CROSS-REFERENCE TO RELATED APPLICATION

This application claims the priority benefit of China application serial no. 202211657868.X, filed on Dec. 22, 2022. The entirety of the above-mentioned patent application is hereby incorporated by reference herein and made a part of this specification.

BACKGROUND

Technical Field

The disclosure relates to a display device, and in particular to a projection device and a safety protection method of the projection device.

Description of Related Art

The imaging principle of a projection system (a projector) is to convert an illumination beam generated by an illumination system into an image beam by a light valve, and then project the image beam onto a projection target (for example, a screen or a wall) through a projection lens, so as to form a projection image. However, on an occasion where a projection system is used, if a person or an animal unconsciously enters the projection range of the projection system, the person or the animal will be irradiated by the projection beam, which may cause damage to eyes. The conventional high-end projector may be matched with various lenses with different specifications. Since the brightness or the projection ranges of the projection beams corresponding to the lenses with different specifications are also different, the required warning ranges are also different. If it is only detected whether any person or animal enters a fixed warning range and the warning range cannot be further adjusted in response to the lenses with different specifications, the usage safety of the projector and the usage convenience the projector cannot be ensured.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a safety protection method of a projection device, which can effectively ensure the usage safety of the projection device.

Other objectives and advantages of the disclosure can be further understood from the technical features disclosed in the disclosure.

In order to achieve one, a part, or all of the above objectives or other objectives, a projection device of the disclosure includes a projection lens module, a light source, a light source driving circuit, a storage circuit, a detection unit, and a control circuit. The projection lens module provides a lens identification signal. The light source driving circuit is coupled to the light source. The storage circuit stores at least one lens information. The detection unit detects whether an object enters a detection range of the detection unit and provides a detection result. The control circuit is coupled to the projection lens module, the light source driving circuit, the storage circuit, and the detection unit, reads corresponding lens information from the at least one lens information in the storage circuit according to the lens identification signal, calculates a warning range according to the lens information, judges whether the object enters the warning range according to the detection result, and controls the light source driving circuit to reduce brightness of the light source or turn off the light source in response to the object entering the warning range.

The disclosure also provides a safety protection method of a projection device including the following steps. A warning range is calculated according to lens information corresponding to a projection lens module. Whether an object enters a warning range is detected. The projection device is controlled to reduce brightness of a light source or turn off the light source in response to the object entering the warning range.

Based on the above, in the embodiments of the disclosure, the warning range of the projection device is calculated according to the lens information, and the projection device is controlled to reduce the brightness of the light source or turn off the light source in response to the object entering the warning range. In this way, the warning range of the projection device is calculated according to the lens information, and the optimal warning range may be set corresponding to the projection lens module with different specifications, thereby effectively ensuring the usage safety of the projection device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

Figure 1:
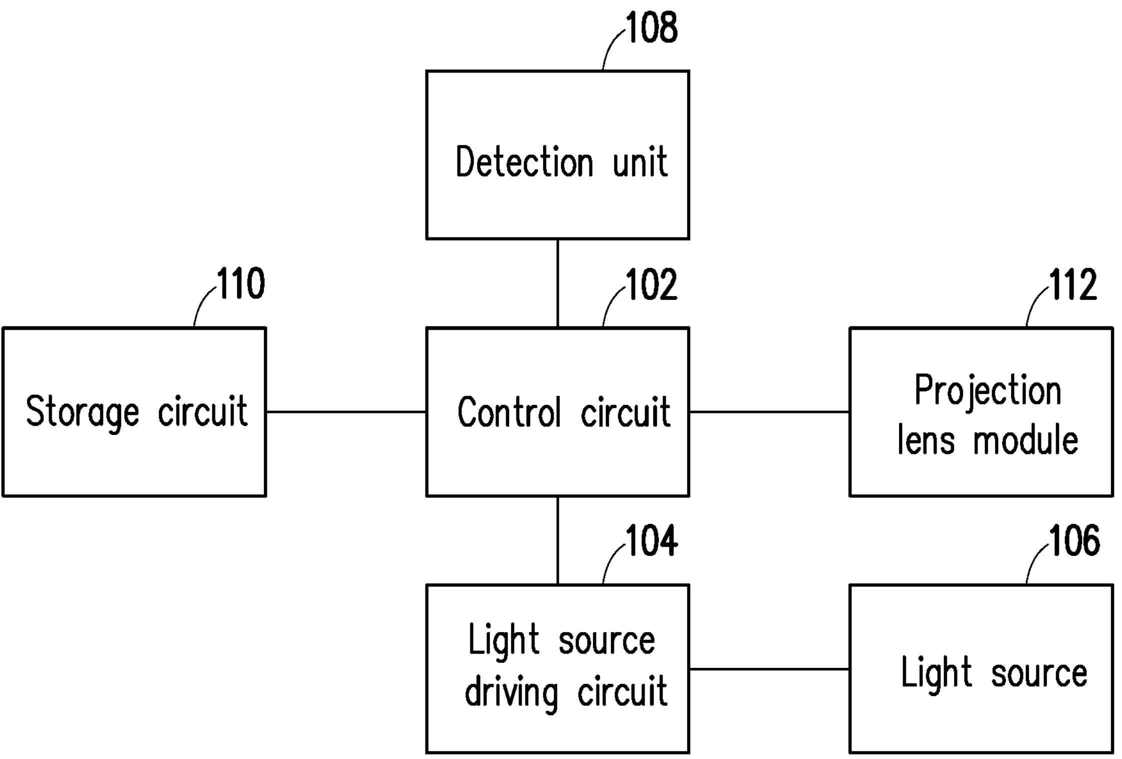
FIG. 1 is a schematic diagram of a projection device according to an embodiment of the disclosure.

FIG. 1 is a schematic diagram of a projection device according to an embodiment of the disclosure. Please refer to FIG. 1. A projection device 100 includes a projector module and a projection lens module 112. The projector module is configured to generate an image beam and transmit the image beam to the projection lens module 112. The projector module includes a control circuit 102, a light source driving circuit 104, a light source 106, a detection unit 108, and a storage circuit 110, wherein the control circuit 102 is coupled to the light source driving circuit 104, the detection unit 108, and the storage circuit 110, the light source driving circuit 104 is coupled to the light source 106, and the control circuit 102 is coupled to the projection lens module 112 when the projection lens module 112 is installed on the projector module. The light source driving circuit 104 may drive the light source 106 to provide an illumination beam to a light valve (not shown) to generate the image beam, and the projection lens module 112 may project a projection beam according to the image beam onto a projection surface to form a projection image. The light source 106 includes, for example, a light emitting element (for example, a light emitting diode or a laser diode). The projector module may further include a light splitting/combining element, a light homogenizing element, a wavelength conversion element, etc., which is not particularly limited in the disclosure. The projection lens module 112 is a detachable projection lens module, that is, the projector module and the projection lens module 112 may, for example, be each provided with a quick connector, so that the projection lens module 112 and the projector module may be separated and combined (that is, the projection lens module 112 may be installed without dismantling the projector module), and the user may replace the projection lens module 112 with the required specification, such as a projection lens module with a different throw ratio, according to requirements. The detection unit 108 is configured to detect whether an object (for example, a person or an animal, but not limited thereto) enters a detection range and provide a detection result to the control circuit 102. The control circuit 102 may judge whether the object enters a warning range according to the detection result (which may include, for example, the distance of the object and the angle relative to the detection unit 108) of the detection unit 108 and control the light source driving circuit 104 to reduce the brightness of the light source 106 or turn off the light source 106 (for example, reduce the brightness of a light emitting element or turn off the light emitting element) in response to the object entering the warning range, so as to prevent the eyes of the person or the animal from being irradiated by the projection beam and damaged to effectively ensure that the usage safety of the projection device 100. The detection unit 108 may, for example, be a time-of-flight sensor, a millimeter wave sensor, or a linear distance sensor to achieve different warning range functions, but not limited thereto.

The storage circuit 110 may store at least one lens information. In some embodiments, the storage circuit 110 may also be disposed in the projection lens module 112 and is not limited to be disposed in the projector module. In other embodiments, the storage circuit 110 may also store related information for projection. The control circuit 102 may control the projector module to generate the image beam and may calculate the warning range according to specification parameters corresponding to the projection lens module 112 in the at least one lens information stored in the storage circuit 110. The lens information includes, for example, an included angle and an included angle range of the projection beam projected by the projection lens module 112, but not limited thereto, for example, the lens information may also include the lens model and the specification parameters of the projection lens module 112. Further, the control circuit 102 may receive the lens identification signal provided by the projection lens module 112 and read the lens information (for example, the lens model) corresponding to the projection lens module 112 from the storage circuit 110 according to the lens identification signal, so as to calculate the warning range according to the lens information of the projection lens module 112, wherein the lens identification signal may be, for example, a voltage signal (for example, analog information or digital information) provided by the projection lens module 112.

Figure 2:
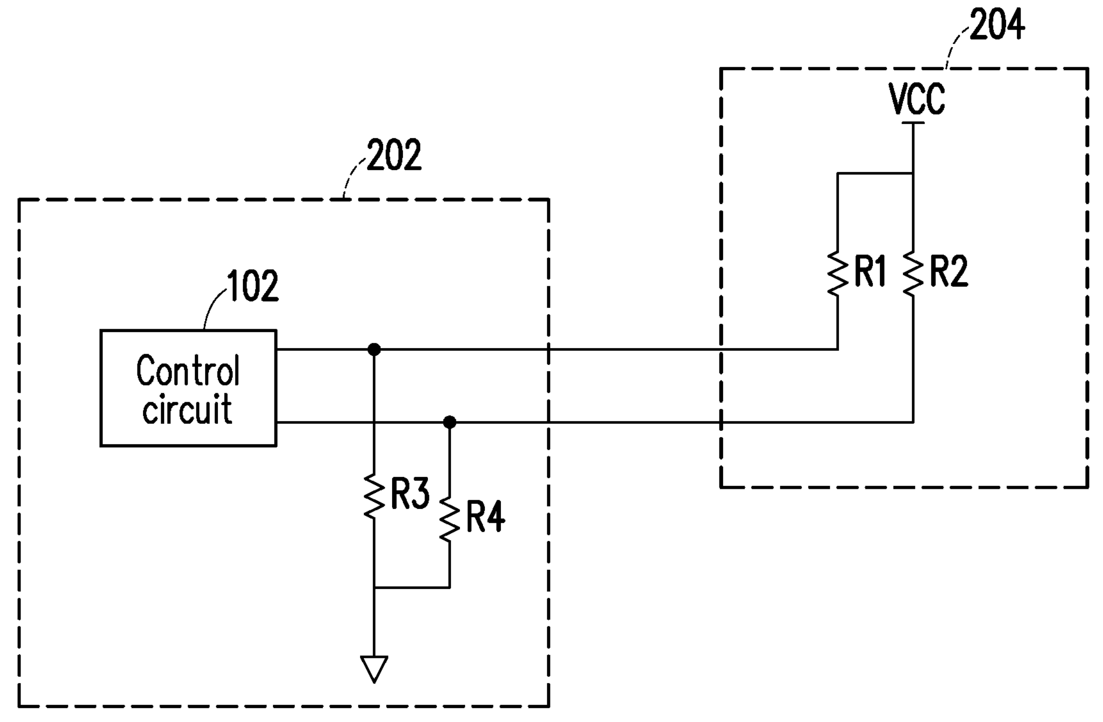
FIG. 2 is a schematic diagram of a main circuit board and a lens circuit board of a projection device according to an embodiment of the disclosure.

For example, as shown in FIG. 2, the projector module of the projection device 100 may further include a projection circuit board 202, and the projection lens module 112 may include a lens circuit board 204. The lens circuit board 204 may include resistors R1 and R2, the projection circuit board 202 may include the control circuit 102 and resistors R3 and R4, and the resistors R1 and R2 are connected in parallel between an operation voltage VCC and the control circuit 102. When the projection lens module 112 is installed on the projector module, the resistor R3 is coupled between the resistor R1 and a ground terminal, the resistor R4 is coupled between the resistor R2 and the ground terminal, and divided voltages respectively provided by a voltage dividing circuit formed by the resistors R1 and R3 and a voltage dividing circuit formed by the resistors R2 and R4 may be used as the lens identification signal of the projection lens module 112. In particular, in the embodiment, since the control circuit 102 obtains the identification signal by the voltage division of the resistors R3 and R4, the resistors R3 and R4 may also be regarded as a part of the control circuit 102, and the disclosure does not particularly limit whether the resistors R3 and R4 are disposed inside the control circuit 102 or outside the control circuit 102. Since the resistance values of the resistors R1 and R2 included in the projection lens module 112 with different specifications are also different, the divided voltages provided by the voltage dividing circuit formed by the resistors R1 and R3 and the voltage dividing circuit formed by the resistors R2 and R4 are also different, so that the control circuit 102 may identify the model (the lens information) of the projection lens module 112 according to the different divided voltages generated by different projection lens modules. For example, the control circuit 102 may store a lookup table that records a correspondence relationship between the divided voltage and the model and the specification parameters (the lens information) of the projection lens module, and the model and the specification parameters of the projection lens module 112 may be obtained according to the divided voltage and the lookup table, so that the warning range may be calculated according to the specification parameters (the lens information) of the projection lens module 112. In particular, in other embodiments, the control circuit 102 and the resistors R3 and R4 may be disposed on different circuit boards in the projector module. In the disclosure, the manner for calculating the warning range by the control circuit 102 may also be implemented in the form of a lookup table. For example, the specification parameters of different projection lens modules correspond to different warning range settings. In other implementations, the manner for calculating the warning range by the control circuit 102 may be calculated according to the specification parameters of the projection lens module, a projection brightness setting, movement of the projection lens module, and/or the current position (that is, a zoom parameter) of a lens group of the projection lens module through a formula to calculate the setting of the warning range (for example, the depth of the warning range).

Figure 3:
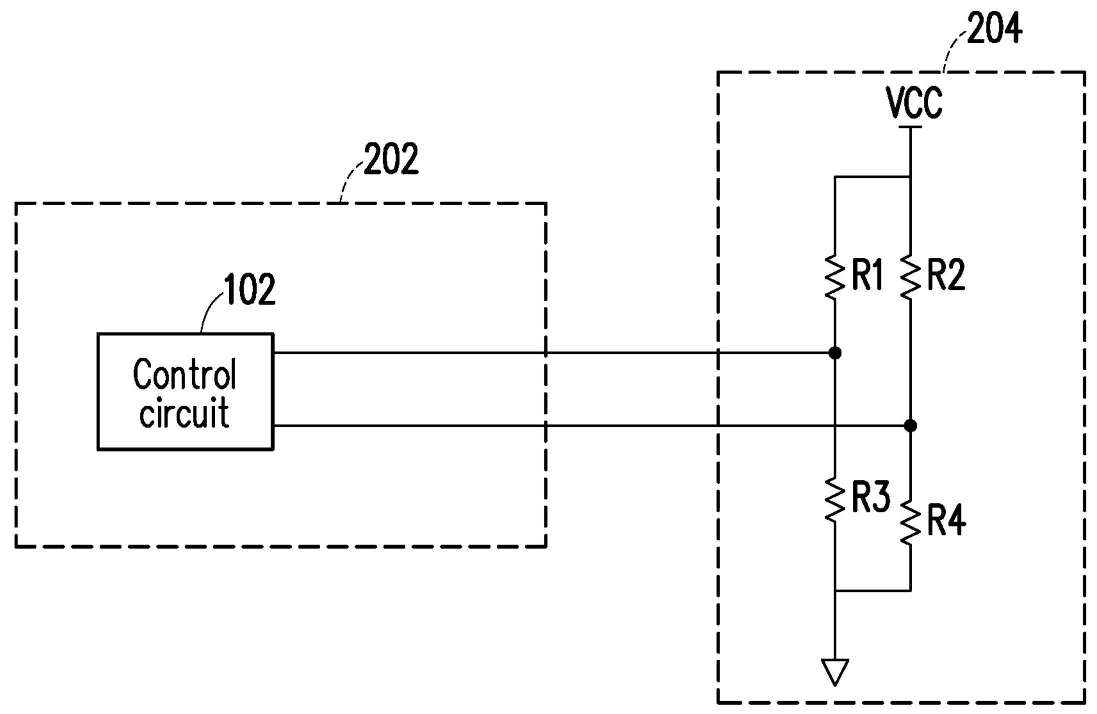
FIG. 3 is a schematic diagram of a main circuit board and a lens circuit board of a projection device according to another embodiment of the disclosure.

In some embodiments, the resistors R3 and R4 may also be disposed in the lens circuit board 204 (as shown in FIG. 3). Similarly, the control circuit 102 may also look up the table according to the divided voltage provided by the projection lens module 112 to obtain the lens information (for example, the model and the specification parameters) of the projection lens module 112 and calculate the warning range according to the lens information (for example, specification parameters) of the projection lens module 112.

Figure 4:
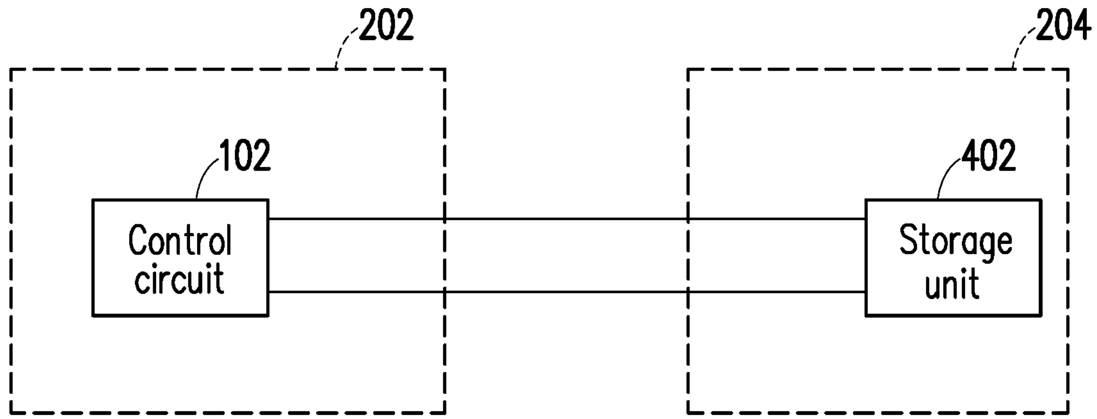
FIG. 4 is a schematic diagram of a main circuit board and a lens circuit board of a projection device according to another embodiment of the disclosure.

Alternatively, as shown in FIG. 4, the projection lens module 112 may further include a storage unit 402. The storage unit 402 is, for example, disposed on the lens circuit board 204 to store the lens information of the projection lens module 112. The storage unit 402 may, for example, be an electrically erasable programmable read only memory (EEPROM), but not limited thereto. When the projection lens module 112 is installed on the projector module, the control circuit 102 may read the storage unit 402, and the projection lens module 112 may provide the lens identification signal corresponding to the lens information to the control circuit 102. The control circuit 102 may obtain the lens information (for example, lens control method) corresponding to the projection lens module 112 through reading the storage circuit 110 according to the lens identification signal, so as to calculate the warning range according to the specification parameters of the projection lens module 112. In particular, the specification parameters of the projection lens module 112 include, for example, at least a throw ratio or a zoom ratio.

In the disclosure, the warning range may be adjusted according to different specification parameters of the projection lens module 112 or different setting parameters of the projection device 100. The details are as follows.

Figure 5A:
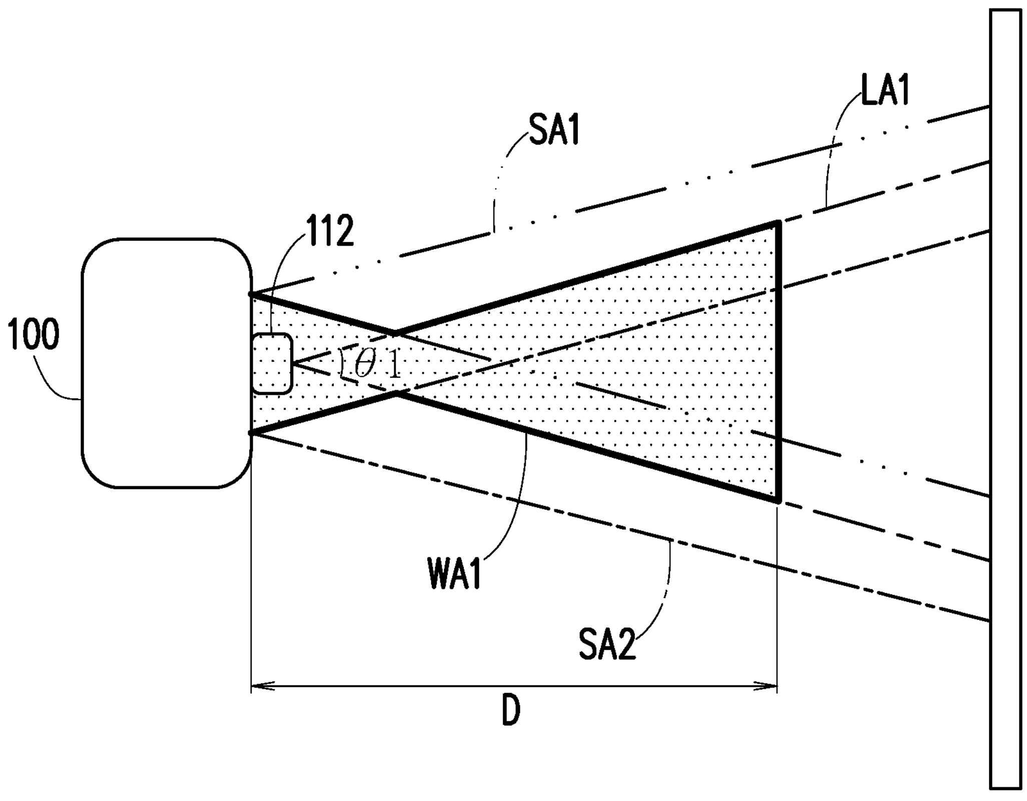
FIG. 5A is a schematic diagram of a warning range of a projection device according to an embodiment of the disclosure.
Figure 5B:
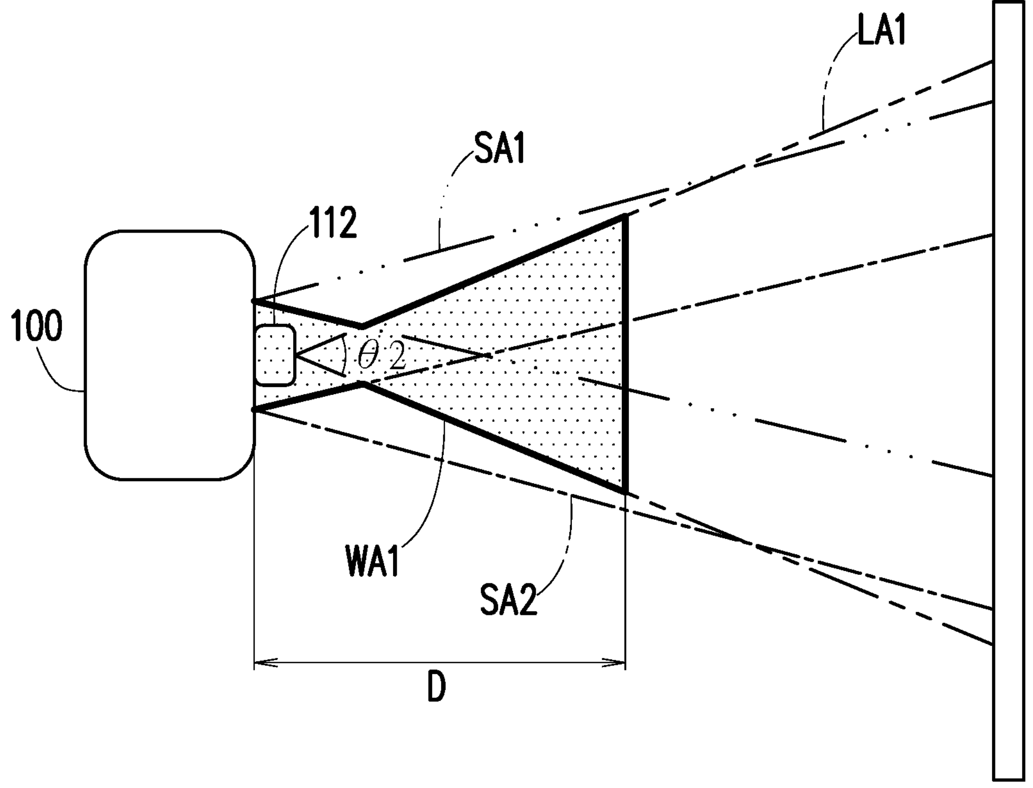
FIG. 5B is a schematic diagram of a warning range of a projection device according to another embodiment of the disclosure.

The warning range may be, for example, associated with at least one of the included angle and the included angle range of the projection beam. The control circuit 102 may adjust the warning range according to a change of the included angle of the projection beam of the projection device 100 (for example, zoom in/out the ratio or replace the projection lens module). For example, as shown in FIG. 5A and FIG. 5B (for example, top views), in the embodiments of FIG. 5A and FIG. 5B, the detection unit 108 may include two sensors (for example, two time-of-flight sensors, but not limited thereto). The two sensors respectively have sensing ranges SA1 and SA2, and the projection beam projected by the projection device 100 has a projection range LA1. As the specification parameters of the projection lens module 112 differs, the projection range LA1 of the projection beam is also different. For example, the lens curvatures of the projection lens module 112 of the embodiments of FIG. 5A and FIG. 5B are different, so that an included angle $\theta 1$ of the projection beam of the embodiment of FIG. 5A is less than an included angle $\theta 2$ of the projection beam of the embodiment of FIG. 5B. Therefore, the projection range LA1 of the embodiment of FIG. 5A is less than the projection range LA1 of the embodiment of FIG. 5B. The smaller the included angle of the projection beam (the more concentrated the projection beam), the stronger the light intensity of the projection beam, so the depth of a warning range WA1 (as shown by the dotted region) needs to be increased (a depth D of the warning range WA1 is, for example, the distance from the projection device 100 to the projection direction of the main beam of the projection beam) (as shown in FIG. 5A and FIG. 5B, the depth of the warning range WA1 of the embodiment of FIG. 5A is greater than the depth of the warning range WA1 of the embodiment of FIG. 5B).

Further, in the embodiments of FIG. 5A and FIG. 5B, the configuration positions of the projection lens module 112 and the detection unit 108 of the projection device 100 are fixed, the sensing ranges SA1 and SA2 of the detection unit 108 are, for example, preset in the system, and the projection range LA1 of the projection lens module 112 may be obtained from the lens information. Therefore, the control circuit 102 may calculate the boundary and the range of the projection range LA1 in the sensing ranges SA1 and SA2 in space. In this way, the boundaries of the warning range WA1 on the two sides may be formed by partial boundaries of the sensing ranges SA1 and SA2 and a partial boundary of the projection range LA1 and combining the projection device 100 and the depth D. For example, from the direction of the projection device 100 toward the projection surface (for example, the direction of the depth D), the boundary on one side (for example, the upper side of FIG. 5A) of the warning range WA1 sequentially starts from the detection unit 108, extends along the boundary of the sensing range SA1 near the side of the projection lens module 112 to the first junction of the sensing range SA1 and the projection range LA1, then turns to the boundary of the projection range LA1, and extends to the depth D of the warning range WA1 (for example, the length of the warning range WA1 in the projection direction of the main beam of the projection beam is the depth D, and the direction of the depth D and the boundary of the projection range LA1 are, for example, not parallel), and the boundary on the other side of the warning range WA1 is also defined in the same way. As such, the boundary on the two sides of the warning range WA1, the line connecting the starting points of the boundary on the two sides of the warning range WA1, and the line connecting the end points of the boundary on the two sides of the warning range WA1 jointly define the warning range WA1, but not limited thereto. In other embodiments, the warning range WA1 may also be expanded within the sensing range of the detection unit 108. It should be noted that in some embodiments, the sensing ranges SA1 and SA2 may be determined by the sensing capability of the sensors or by the control circuit 102 according to the included angle of the projection beam, that is, the sensing ranges SA1 and SA2 determined by the control circuit 102 may be less than the sensing range of the sensor. In particular, the adjustment of the depth of the warning range may be designed differently according to different usage scenarios and is not limited to the implementation manner in which the depth of the warning range is inversely proportional to the included angle of the projection beam.

In addition, in other embodiments, the projection lens module 112 is, for example, a zoom lens, and the control circuit 102 may also control the projection lens module 112 to adjust the size of the projection image, so as to change the included angle of the projection beam. Therefore, the control circuit 102 may not only consider the specification parameters of the projection lens module 112 to calculate the warning range WA1, but also consider the projection setting parameters of the projection device 100 to calculate the warning range WA1. For example, the smaller the size of the projection image, the deeper the depth of the warning range WA1. In addition, in other embodiments, the warning range WA1 may also be adjusted according to a setting change of projection brightness of the projection device 100 (a light intensity change of the illumination beam provided by the light source 106). For example, the stronger the projection brightness set by the projection device 100, the deeper the depth of the warning range WA1.

Figure 6A:
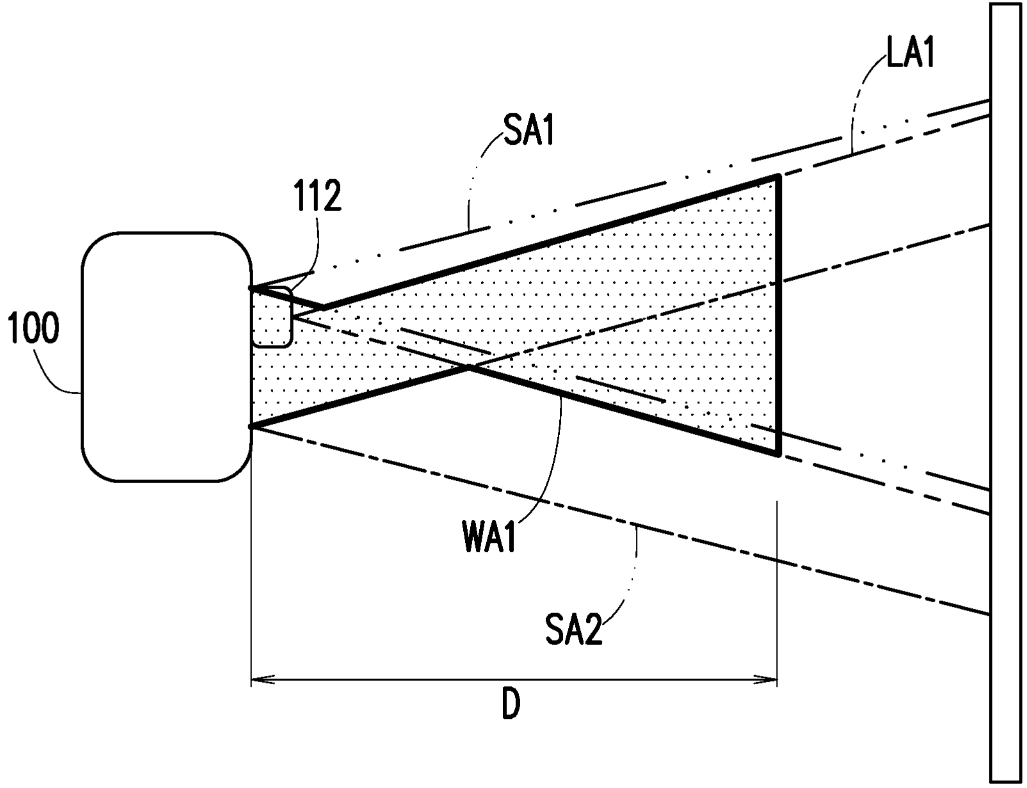
FIG. 6A is a schematic diagram of a warning range of a projection device according to an embodiment of the disclosure.
Figure 6B:
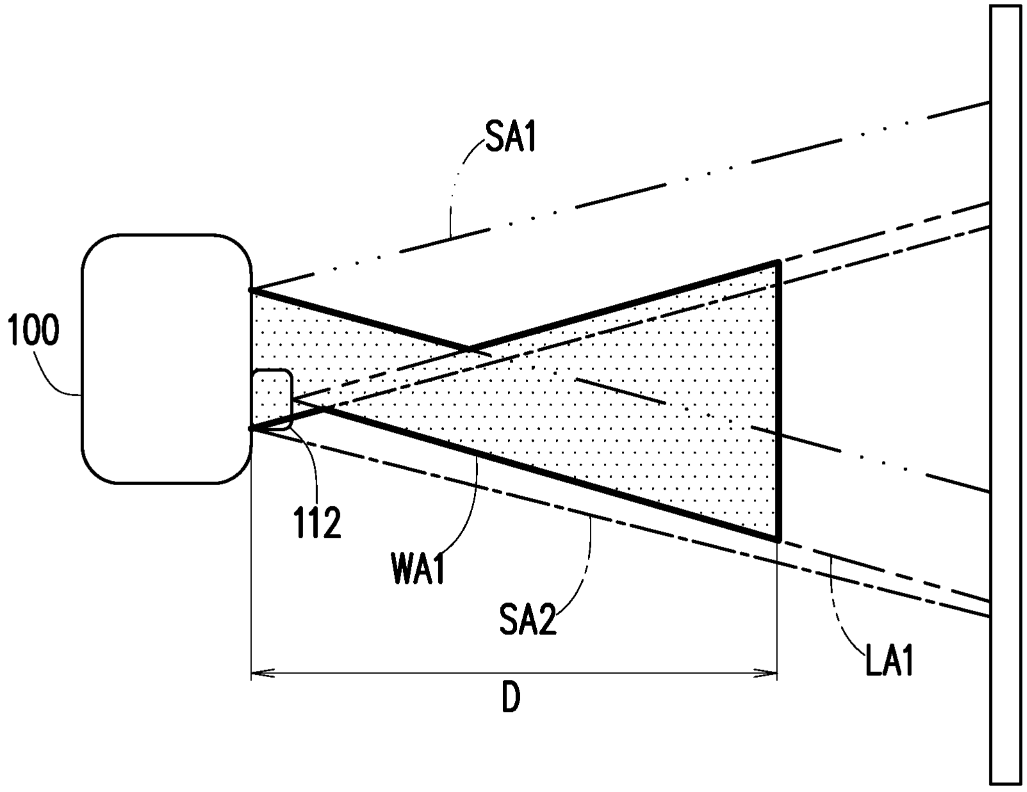
FIG. 6B is a schematic diagram of a warning range of a projection device according to another embodiment of the disclosure.

In addition, the warning range may also be adjusted according to a movement of the projection lens module. For example, as shown in the embodiment of FIG. 6A, when the control circuit 102 controls the projection lens module 112 to move to the left (as shown in FIG. 6A, the projection range LA1 moves toward the top of the drawing), the warning range WA1 also correspondingly moves to the left. For another example, as shown in the embodiment of FIG. 6B, when the control circuit 102 controls the projection lens module 112 to move to the right (as shown in FIG. 6B, the projection range LA1 moves toward the bottom of the drawing), the warning range WA1 also correspondingly moves to the right.

Figure 7A:
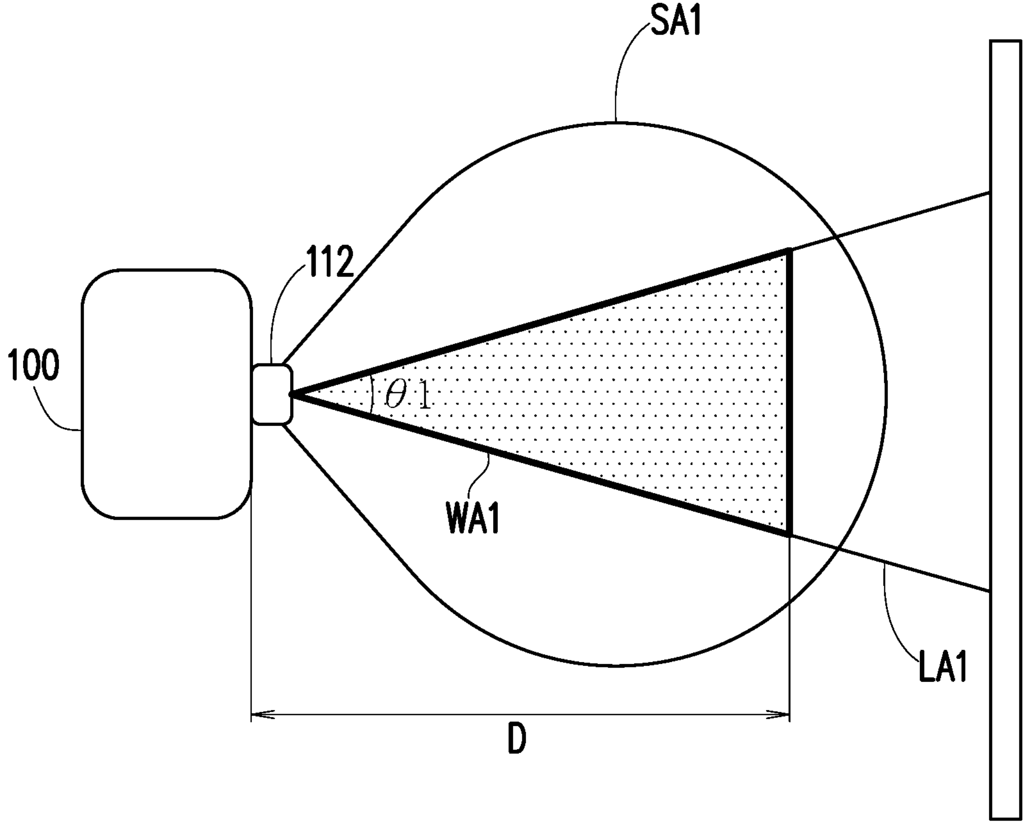
FIG. 7A is a schematic diagram of a warning range of a projection device according to an embodiment of the disclosure.
Figure 7B:
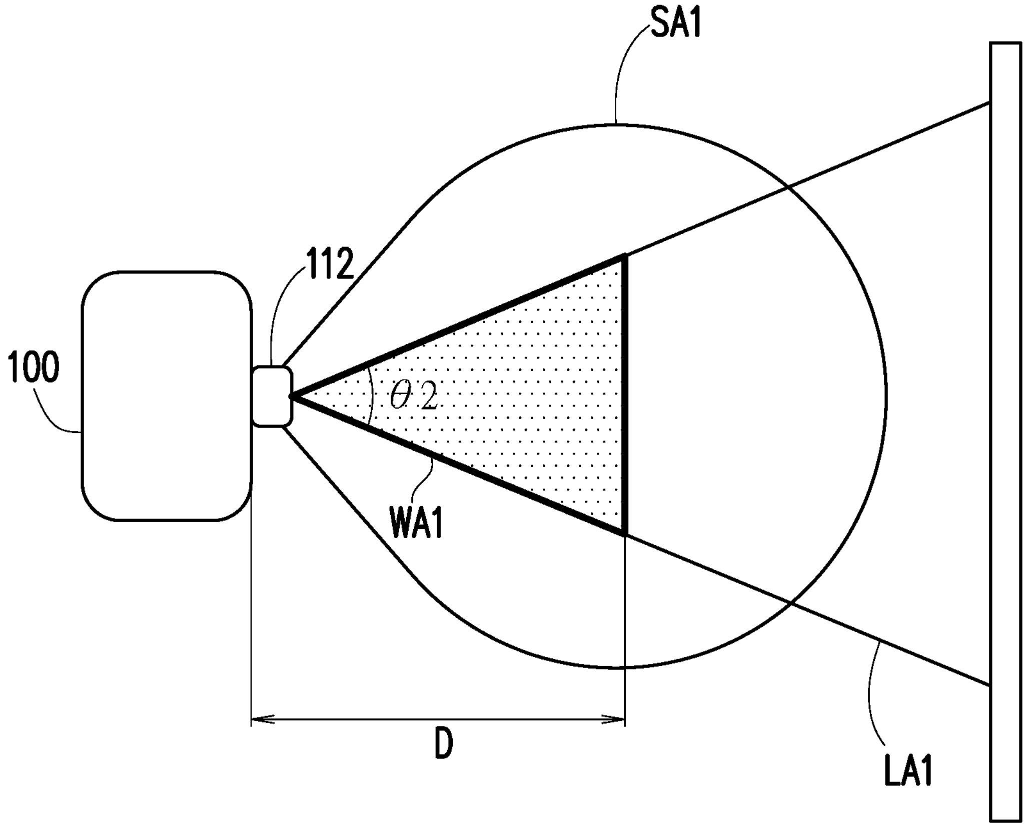
FIG. 7B is a schematic diagram of a warning range of a projection device according to another embodiment of the disclosure.

FIG. 7A and FIG. 7B are schematic diagrams of a warning range of a projection device according to an embodiment of the disclosure. In the embodiments of FIG. 7A and FIG. 7B, the detection unit 108 is implemented by a millimeter wave sensor, and the warning range WA1 is a part of the projection range LA1 of the projection beam. Similar to the embodiments of FIG. 5A and FIG. 5B, the control circuit 102 may adjust the warning range WA1 according to the change of the included angle of the projection beam, and the smaller the included angle of the projection beam, the deeper the depth of the warning range WA1. For example, the depth of the warning range WA1 of the embodiment of FIG. 7A is deeper than the depth of the warning range WA1 of the embodiment of FIG. 7B.

Figure 8A:
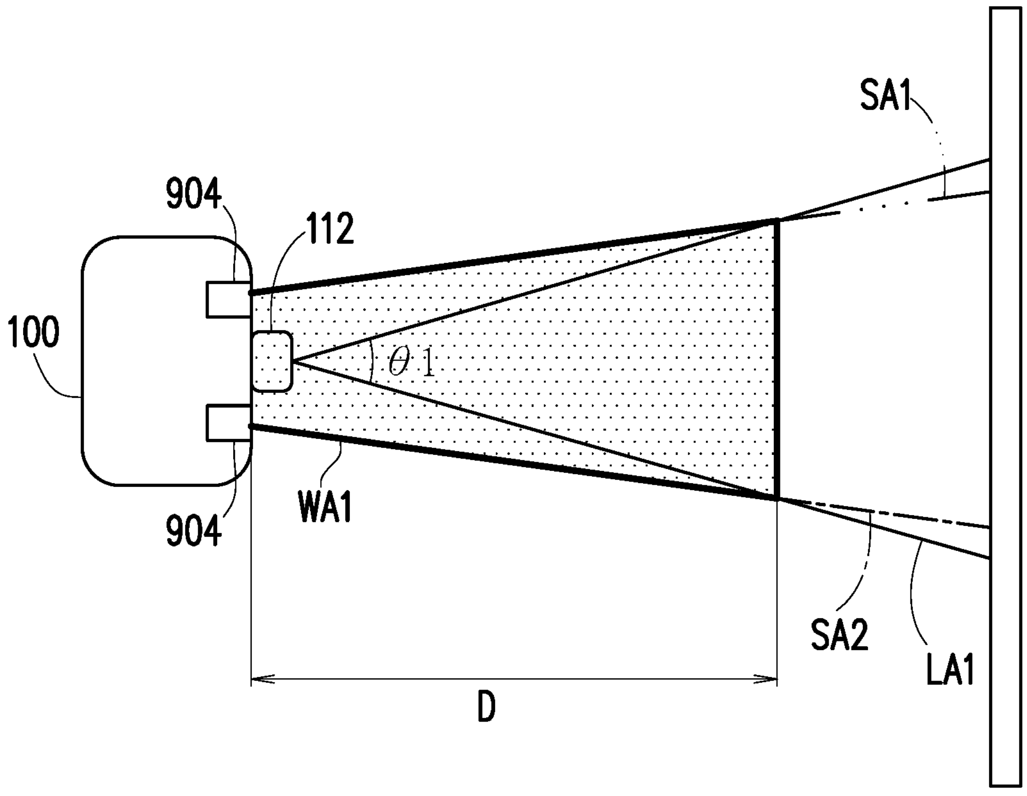
FIG. 8A is a schematic diagram of a warning range of a projection device according to an embodiment of the disclosure.
Figure 8B:
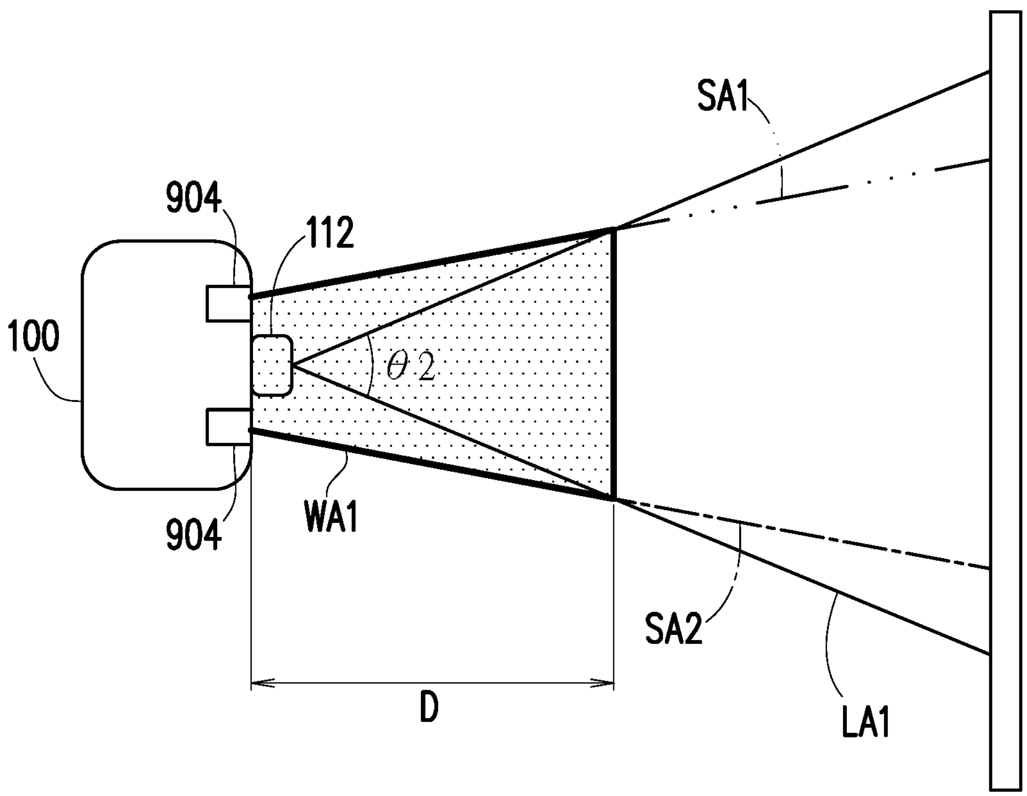
FIG. 8B is a schematic diagram of a warning range of a projection device according to another embodiment of the disclosure.
Figure 9:
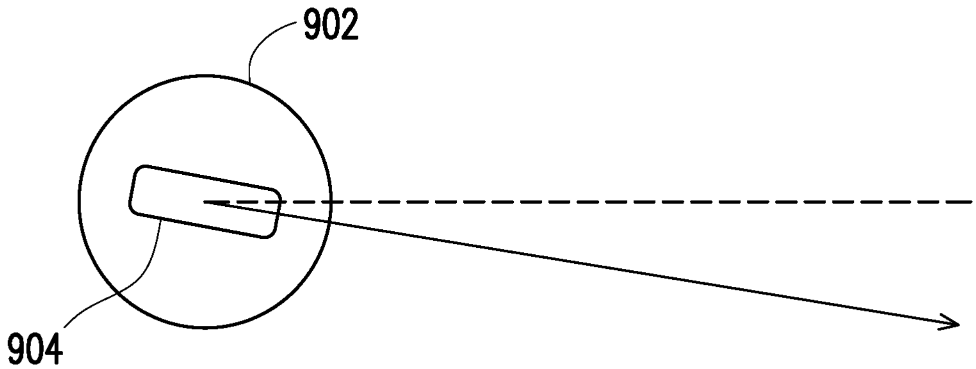
FIG. 9 is a schematic diagram of a linear distance sensor and a rotation structure according to another embodiment of the disclosure.

FIG. 8A and FIG. 8B are schematic diagrams of a warning range of a projection device according to an embodiment of the disclosure. In the embodiment of FIG. 8A and FIG. 8B, the detection unit 108 is implemented by two linear distance sensors. The two linear distance sensors are, for example, disposed on the left and right sides of the projection lens module 112, so the sensing ranges SA1 and SA2 of the two sensors are both straight lines, and the two sensors can only sense the distance of an object passing on the straight lines. The left and right boundary of the warning range WA1 may be the sensing ranges SA1 and SA2, and the warning range WA1 is obtained by combining the calculated depth of the warning range. Similar to the embodiments of FIG. 5A and FIG. 5B, the control circuit 102 may adjust the warning range WA1 according to the change of the included angle of the projection beam, and the smaller the included angle of the projection beam, the deeper the depth of the warning range WA1. For example, the depth of the warning range WA1 of the embodiment of FIG. 8A is deeper than the depth of the warning range WA1 of the embodiment of FIG. 8B. In other embodiments, another linear distance sensor may be added above the projection lens module 112 to further sense whether an object enters the warning range WA1. In addition, since the width of the warning range WA1 may be adjusted corresponding to the change of the included angle of the projection beam, the projection device 100 may also include a rotation structure 902 as shown in FIG. 9. The rotation structure 902 may be coupled to the control circuit 102. Each linear sensor 904 of the detection unit 108 may be respectively disposed on the corresponding rotation structure 902. The control circuit 102 may adjust the sensing direction of the linear sensor 904 through controlling the rotation of the rotation structure 902, thereby adjusting the width of the warning range WA1.

Figure 10:
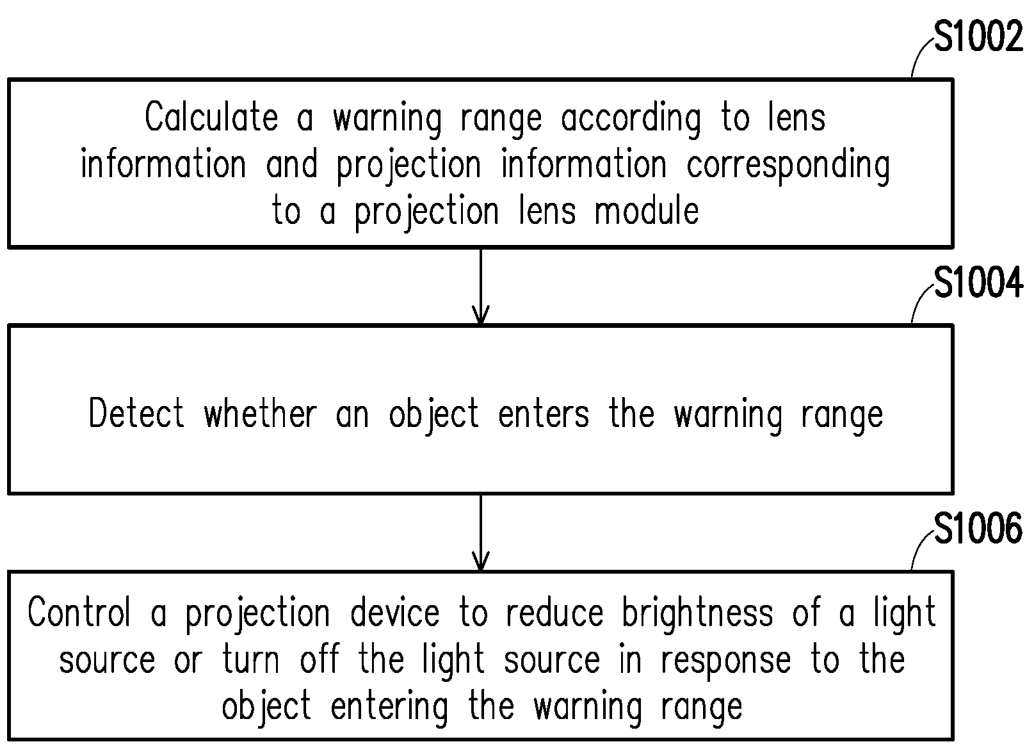
FIG. 10 is a flowchart of a safety protection method of a projection device according to an embodiment of the disclosure.

FIG. 10 is a flowchart of a safety protection method of a projection device according to an embodiment of the disclosure. It may be known from the above embodiments that the safety protection method of the projection device may at least include the following steps. First, a warning range is calculated according to lens information (Step S1002), wherein the lens information may include at least one of an included angle and an included angle range of a projection beam, and the warning range may be, for example, adjusted according to at least one of included angle change of the projection beam of the projection device (for example, according to the zoom in/out ratio), a movement of a projection lens module, and a projection brightness change of the projection device. In some embodiments, the lens information may also include the lens model and the specification parameters of the projection lens module. Next, whether an object enters the warning range is detected (Step S1004). For example, whether the object enters the warning range may be detected using a time-of-flight sensor, a millimeter wave sensor, or a linear distance sensor. Finally, the light source driving circuit is controlled to reduce brightness of a light source or turn off the light source in response to the object entering the warning range (Step S1006).

In summary, in the embodiments of the disclosure, the warning range of the projection device is calculated according to the lens information, and the projection device is controlled to reduce the brightness of the light source or turn off the light source in response to the object entering the warning range. In this way, the warning range of the projection device is calculated according to the lens information, and the optimal warning range may be set corresponding to the projection lens module with different specifications, thereby effectively ensuring the usage safety of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising a projection lens module, a light source, a light source driving circuit, a storage circuit, a detection unit, and a control circuit, wherein:

the projection lens module provides a lens identification signal;

the light source driving circuit is coupled to the light source;

the storage circuit stores at least one lens information;

the detection unit detects whether an object enters a detection range of the detection unit and provides a detection result; and the control circuit is coupled to the projection lens module, the light source driving circuit, the storage circuit, and the detection unit, configured to read corresponding lens information from the at least one lens information in the storage circuit according to the lens identification signal, configured to calculate a warning range according to the lens information, configured to judge whether the object enters the warning range according to the detection result, and configured to control the light source driving circuit to reduce brightness of the light source or turn off the light source in response to the object entering the warning range.

2. The projection device according to claim 1, wherein the detection unit comprises a time-of-flight sensor, a millimeter wave sensor, or a linear distance sensor.

3. The projection device according to claim 1, wherein the detection unit is a linear distance sensor, the projection device comprising:

a rotation structure, coupled to the control circuit, wherein the linear distance sensor is disposed on the rotation structure, and the control circuit controls rotation of the rotation structure to adjust the warning range.

4. The projection device according to claim 1, wherein the control circuit is configured to adjust the warning range according to a projection beam included angle change of the projection device or a movement of the projection lens module.

5. The projection device according to claim 1, wherein the control circuit is configured to adjust the warning range according to a projection brightness change of the projection device.

6. The projection device according to claim 1, wherein the lens information comprises at least one of an included angle and an included angle range of a projection beam.

7. The projection device according to claim 1, wherein the projection lens module further comprises a storage unit to store the lens information of the projection lens module, and the lens identification signal provided by the projection lens module corresponds to the lens information.

8. A safety protection method of a projection device, comprising:

obtaining lens information corresponding to a projection lens module from at least one lens information in a storage circuit according to a lens identification signal provided by the projection lens module;

calculating a warning range according to the lens information corresponding to the projection lens module;

detecting whether an object enters the warning range; and controlling the projection device to reduce brightness of a light source or turn off the light source in response to the object entering the warning range.

9. The safety protection method of the projection device according to claim 8, wherein whether the object enters a detection range is detected using a time-of-flight sensor, a millimeter wave sensor, or a linear distance sensor.

10. The safety protection method of the projection device according to claim 8, comprising:

adjusting the warning range according a projection beam included angle change of the projection device or a movement of the projection lens module.

11. The safety protection method of the projection device according to claim 8, wherein the warning range is adjusted according to a projection brightness change of the projection device.

12. The safety protection method of the projection device according to claim 8, wherein the lens information comprises at least one of an included angle and an included angle range of a projection beam.

13. A safety protection method of a projection device, comprising:

calculating a warning range according to lens information corresponding to a projection lens module;

detecting whether an object enters the warning range, wherein the warning range is adjusted according to a projection beam included angle change of the projection device, a movement of the projection lens module, or a projection brightness change of the projection device; and controlling the projection device to reduce brightness of a light source or turn off the light source in response to the object entering the warning range.

14. A safety protection method of a projection device, comprising:

calculating a warning range according to lens information corresponding to a projection lens module, wherein the lens information comprises at least one of an included angle and an included angle range of a projection beam;

detecting whether an object enters the warning range; and controlling the projection device to reduce brightness of a light source or turn off the light source in response to the object entering the warning range.

* * * * *